April 21, 1970  A. N. PEDERSEN  3,507,292
CONTINUOUS FEED APPARATUS FOR STAINING SPECIMENS
CARRIED ON SLIDES
Filed Jan. 27, 1969  4 Sheets-Sheet 1

INVENTOR.
ANDERS N. PEDERSEN
BY
Townsend and Townsend
ATTORNEYS

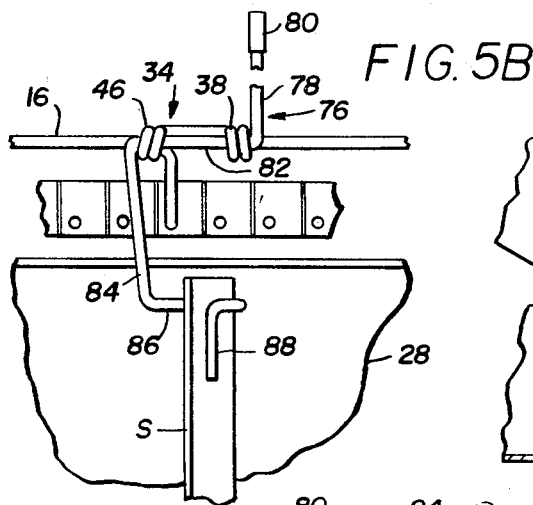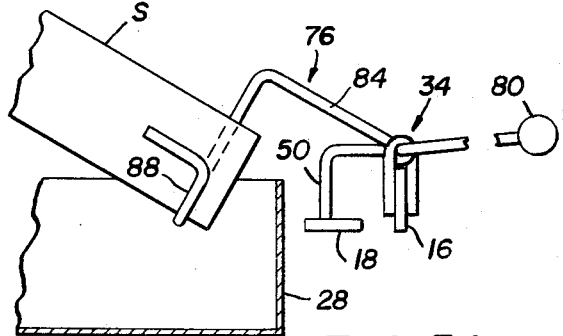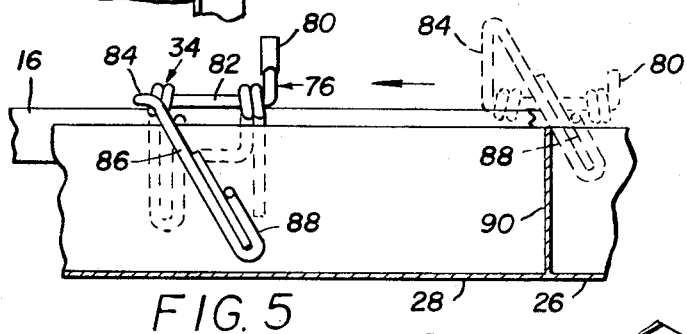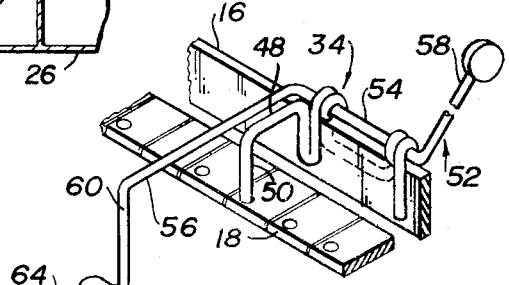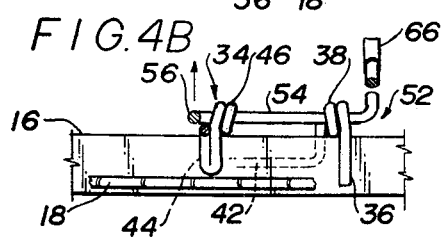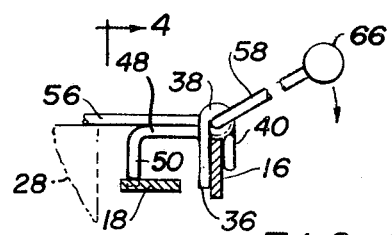

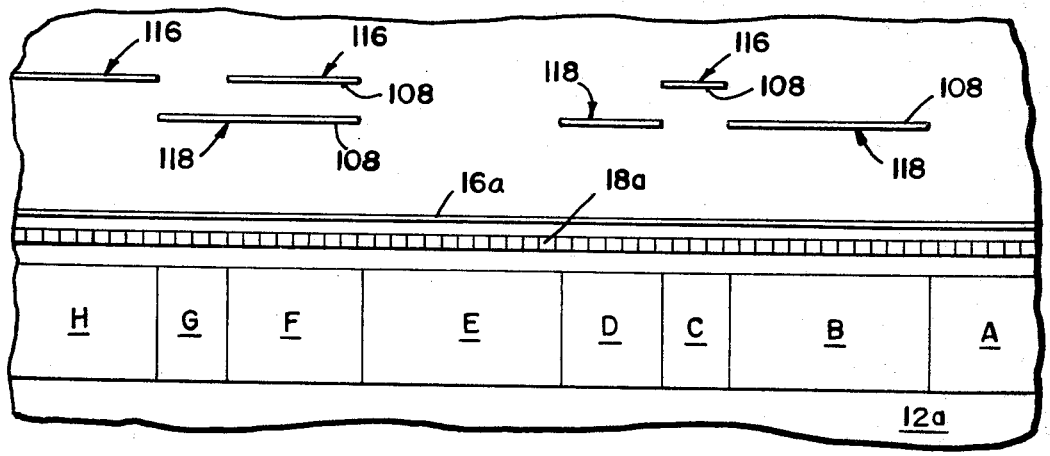
FIG_8
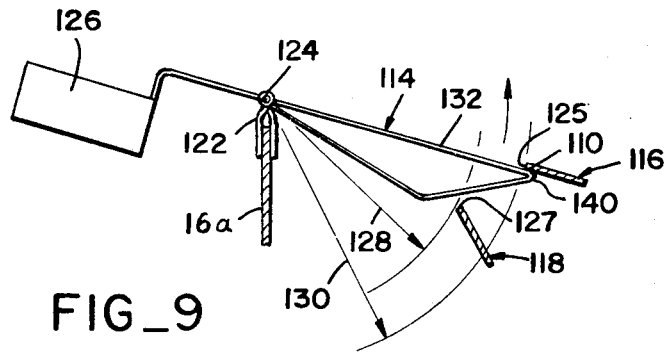
FIG_9
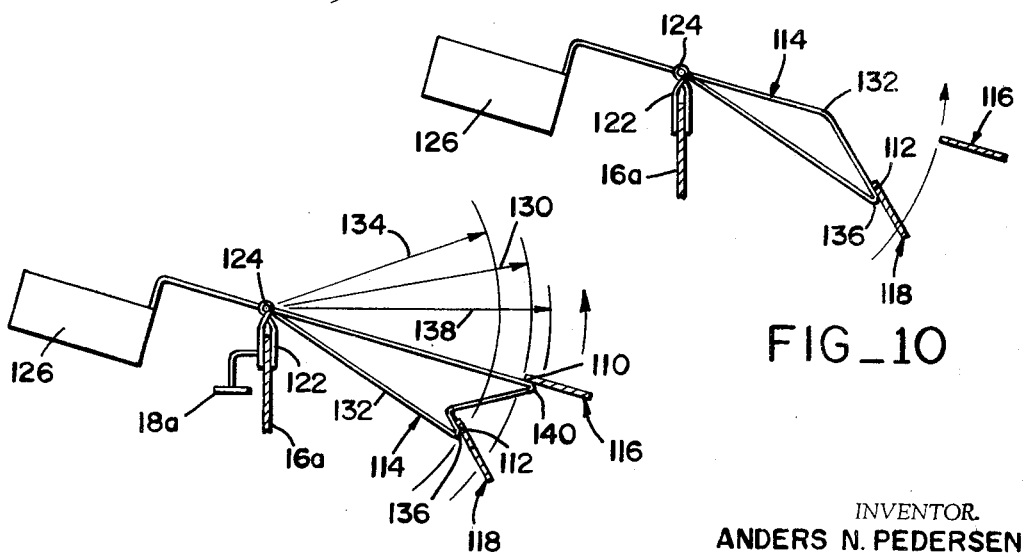
FIG_10
FIG_11

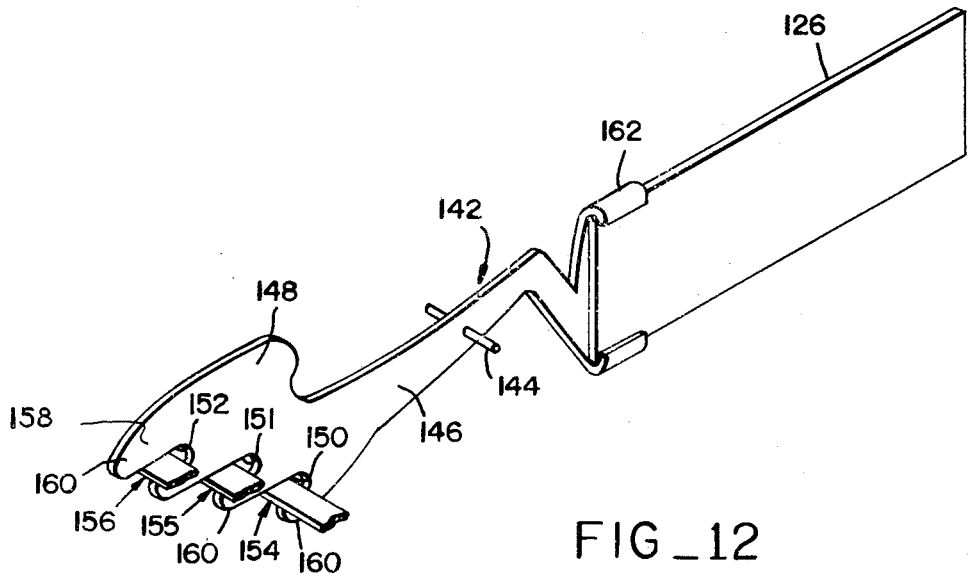
FIG_12
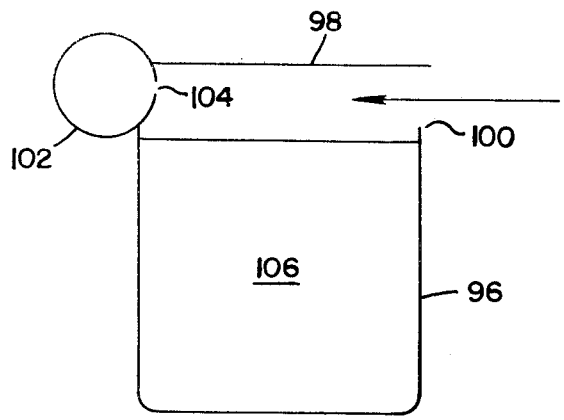
FIG_13

United States Patent Office 3,507,292
Patented Apr. 21, 1970

3,507,292
CONTINUOUS FEED APPARATUS FOR STAINING SPECIMENS CARRIED ON SLIDES
Anders N. Pedersen, 2291 Stockton, Apt. 304, San Francisco, Calif. 94133
Continuation-in-part of application Ser. No. 644,216, June 7, 1967. This application Jan. 27, 1969, Ser. No. 814,490
Int. Cl. B05c 3/10
U.S. Cl. 134—75
18 Claims

ABSTRACT OF THE DISCLOSURE

A device for transporting specimens carried on microscope slides through a plurality of liquid containing jars for staining or otherwise treating the specimens. An endless conveyor effects the transport of the slides and the slide carrier is demountably connected to the conveyor. A slide engaging bail is included in the carrier and is secured to the body of the carrier for pivotal movement so that the slides supported on the bail can be lifted above the jar walls in passing from one jar to a succeeding jar. A counterweight on the bail minimizes the force required to pivotally raise the slide. The bail may include suspension rod engaging surfaces to prevent the immersion of the slide in one or more of the plurality of jars.

This application is a continuation-in-part application of the copending patent application bearing Ser. No. 644,216, filed June 7, 1967, now abandoned and entitled "Continuous Feed Apparatus for Staining Specimen-Carried Slides."

This invention relates to apparatus for staining specimens carried on microscope slides such as used in the pathological inspection of human tissue. More particularly, the invention relates to slide transporting apparatus that sequentially conveys specimen bearing slides into and out of a plurality of staining solutions and like liquid media in such a manner that the slide is substantially drained before egress from a particular solution and is transported gently so as to avoid damage to the slide or the specimen carried thereon.

The specific embodiments of the invention that are described in more detail hereinafter include an elongate rail supported horizontally and an endless conveyor chain having a forward moving reach constrained for movement along a path generally parallel to the rail. Disposed in proximity to the chain and rail along the path defined thereby is a plurality of open top jars for containing the various liquid media used in staining slide mounted specimens. A plurality of slide supporting carriers is provided; each carrier is adapted for removable placement on the rail for sliding movement therealong. Such carrier is provided with a projection for engaging the endless conveyor so that the carrier and the slide supported thereby are moved along the rail and through the various jars as the endless conveyor advances. Each carrier includes a slide engaging bail that is pivotally mounted with respect to the body of the carrier so that in traversing from one jar to a succeeding jar, the slide is lifted over the side wall of the jar. Means are provided for so pivotally moving the bail without subjecting the bail and the slide carried thereby to unnecessary vibration or impact.

Means can further be provided for engaging the bail and suspending it above a preselected jar or preselected jars during its movement past the jars to prevent the immersion of the slide in certain of the liquids. This enables the use of the apparatus for the treatment of slides having mounted thereon differing specimens and/or requiring different chemical treatments to achieve varied purposes in treating such specimens.

An object of the present invention is to provide a simple and inexpensive slide staining apparatus that permits one or more specimen bearing slides to be sequentially transported through the staining apparatus. Achievement of this object is to be contrasted with certain prior art slide staining structures in which a plurality of specimen bearing slides is stained at one time in a batch process. Attainment of this objection affords greater versatility and materially expedites the processing of slides, because it is unnecessary to wait until a number of specimens are ready for staining as is the case in a batch process. In accomplishing this object the present invention provides apparatus for moving slides along a linear path in which path are disposed jars for containing the various liquid media used in staining processes.

Another object is to provide apparatus which is arranged to minimize the transfer of one liquid medium to the liquid medium contained in a succeeding jar. This object is achieved by pivoting the slides at the region where the slide egresses from one jar for entry into the next so that the slide assumes a position in which one corner thereof is lower than the remainder of the slide. In such position most of the liquid on the slide drips from the slide in response to the force of gravity. The transfer is sufficiently rapid, however, to prevent the specimen from drying out. Additionally, the lower edge of the slide is caused to rub against a jar wall as the slide exits from such jar so as to assist further the removal of liquid from the slide before passage to a succeeding jar.

Still another object is to provide slide staining apparatus which requires only minimum operator attention. Achievement of this object is made possible by providing a supporting rail in parallelism with a chain conveyor and by extending the rail beyond the terminal end of the chain. Slide carriers are provided for movement along the rail, and the slide carriers accumulate on the portion of the rail extending beyond the chain when the carriers have traversed the portion of the path in which the staining media containers are disposed. Located adjacent to the rail extension is a jar containing an inert media in which the slides reside, without drying out, until the operator is ready to process further such slides. Accordingly, the operator of the apparatus need only feed the slide bearing carriers to the input of the apparatus without concerning himself with the output end thereof.

Yet another object is to provide slide transporting apparatus that feeds, with minimal power consumption, the slides through plural containers of staining solutions without subjecting the slides, or the specimens carried on the slides, to substantial vibration or impact such as would damage the slides or specimens. This object is achieved by providing a pivotally mounted bail that has a slide engaging clip on one side of the axis of pivotal movement and a counterweight on the other side of the axis. The counterweight is adapted to impose torque at the pivotal axis that has a magnitude only slightly less than the oppositely directed torque imposed at the axis by the slide. Moreover, the arm of the bail that supports the counterweight is adapted so that the torque imposed thereby varies in proportion to variations in torque imposed by the slide resulting from addition and subtraction of buoyancy forces as the slide enters and exits from liquid media.

A still further object of the present invention is to adapt the apparatus for the simultaneous treatment of slides requiring the immersion in different liquid media, for different lengths of time, or in different sequences. Accordingly, suspension rods are provided to co-act with the bail and maintain the slide suspended above particular, preselected jars during the movement of the bail and the specimen past such jars. Different immersion times, sequences, and liquid media can thereby be employed for treating the same or different samples according to various treating methods.

These and other objects will be more apparent after referring to the following specification and accompanying drawings in which:

FIG. 3 is a perspective view at an enlarged scale of a slide carrier assembly constructed according to the invention;

FIG. 4 is a side view of FIG. 3;

FIG. 4A is an end view of FIG. 4;

FIG. 4B is a top view of FIG. 4;

FIG. 5 is a side view of an alternate form of slide carrier of this invention;

FIG. 5A is an end view of FIG. 5;

FIG. 5B is a top view of FIG. 5;

FIG. 8 is a schematic, fragmentary plan view of a slide treating apparatus constructed according to the present invention and provided with means for suspending at least some of the slides during their passage past preselected jars;

FIG. 9 is a schematic, end elevational view, similar to FIG. 7, of a slide carrier assembly engaged by a first suspension bar;

FIG. 10 is a view similar to FIG. 9 that illustrates the slide carrier assembly illustrated by a second suspension bar;

FIG. 11 is a view similar to FIG. 9 and illustrates a slide carrier assembly constructed to engage simultaneously two sets of suspension rods;

FIG. 12 is a perspective view of the pivotal arm of a slide carrier assembly, mounting a slide, and being constructed to simultaneously engage three suspension rods; and FIG. 13 is a schematic, side elevational view, in section, of a jar provided with a fume exhaust cover.

Figure 1:
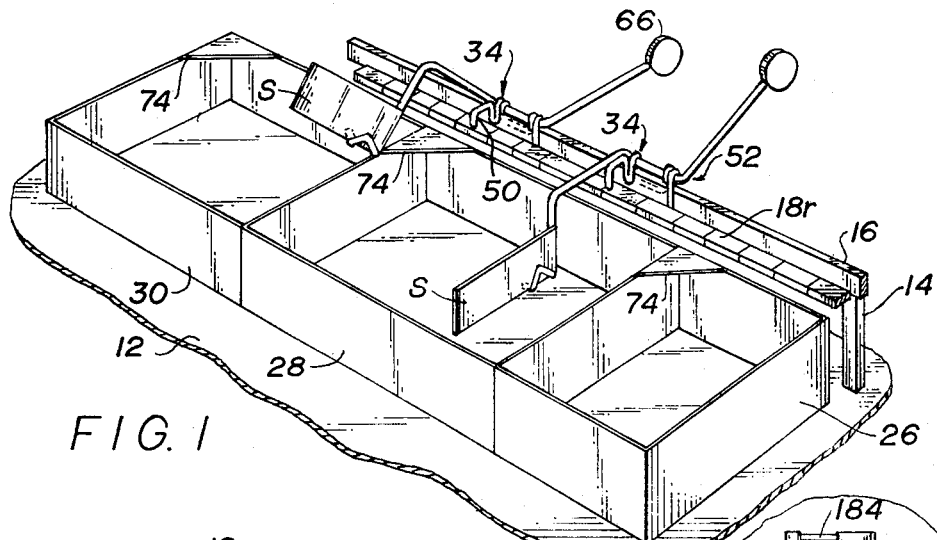
FIG. 1 is a schematic perspective view of a slide staining apparatus constructed according to the present invention.

Referring more particularly to FIG. 1, reference numeral 12 indicates a base surface for supporting the apparatus of this invention. Extending upwardly from base surface 12 is one or more brackets 14 which support an elongate rail 16 in substantial parallelism to surface 12. Rail 16 is provided with smooth, low friction, top and lateral surfaces. Mounted in parallel spaced relation to the rail is an endless conveyor chain 18 which is supported adjacent the inlet end of the staining path on a sprocket 20 driven from a motor 22, and at the outlet end by an idler sprocket 24. Conveyor chain 18 has an upper reach 18r (see FIG. 1) oriented in parallel relation to rail 16.

Base surface 12 affords a supporting surface along a path parallel to upper chain reach 18r for a plurality of jars, exemplary ones of which are indicated at 26, 28, 30 and 32. As can be seen most clearly in FIG. 1, the jars are open topped and have varying longitudinal extents so that the time required for a slide moving with conveyor reach 18r to traverse one of the jars is proportional to the longitudinal extent of the jar.

Adapted for slideable engagement with rail 16 is a number of carriers, an exemplary one of which is indicated at 34 in FIG. 4. The carrier is formed of a length of wire that includes a first terminus 36 which is joined to a double looped portion 38 that defines a generally circular opening. The carrier includes a depending vertical leg 40, arranged in parallel spaced apart relation to terminus 36, and a horizontally extending bight portion 42, which at the end remote from depending portion 40, is bent upward at 44 and double looped at 46 to form a second circular opening aligned coaxially with the opening formed by double looped portion 38. The carrier is completed by a hook portion which extends laterally and downwardly from double looped portion 46, the hook portion including a laterally extending horizontal leg 48 and a second vertically disposed terminus end 50. The hook is arranged so that terminus 50 engages reach 18r of conveyor chain 18 so as to slidably advance the carrier along rail 16 in response to forward movement of the conveyor chain.

For supporting specimen bearing microscope slides a bail 52 is provided. The bail has a central bight 54 that is oriented generally perpendicular to the remainder of the bail and is adapted to pivotally reside within double looped portions 38 and 46 of carrier 34 so as to support the bail for pivotal movement with respect to the carrier. Extending in opposite lateral directions from central bight 54 are a slide supporting arm 56 and a counter balancing arm 58. Slide supporting arm 56 at the free end thereof is formed with a downwardly depending leg 60 for engaging one face of the slide, an upwardly bent inverted V clip portion 62 for engaging the opposite face of the slide, and an end hook 64 for contacting the same face of the slide as is contacted by depending portion 60. Thus, the slide S (see FIG. 6) is firmly secured to bail 52. Counterbalancing arm 58 is provided at its free end with a counterweight 66 of suitable weight to partially but not completely counterbalance the weight of slide S. Counterweight 66 preferably has at least one flat surface to define a face on which a label, typically placed on a microscope slide to identify the specimen carried by the slide, can be temporarily disposed during treatment of the slide in the liquid media in the jars.

Figure 6:
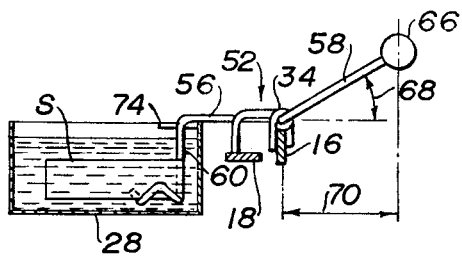
FIG. 6 is a partial schematic view of a slide immersed in a staining solution.
Figure 7:
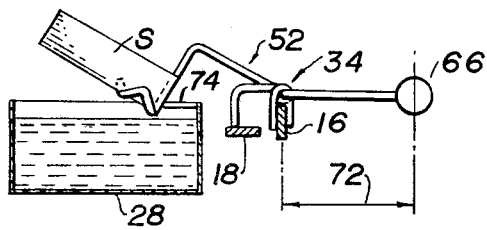
FIG. 7 is similar to FIG. 6, the slide being lifted for passage from one jar to a succeeding jar.

As can be seen most clearly in FIGS. 6 and 7, counterbalancing arm 58 is oriented so as to define an acute angle 68 with respect to the longitudinal axis of slide supporting arm 56. Thus when slide S is immersed in the liquid medium in jar 28, the length of lever arm 70 at which the weight of the counterweight 66 is imposed is less than the length 72 (see FIG. 7) when slide S is lifted out of the liquid medium. Consequently, the counterbalancing effect caused by counterweight 66 is proportional to the weight of slide S so that the weight of the slide always biases the slide downwardly into the liquid medium. While the slide is immersed in the liquid the lower end of V-clip portion 62 drags along the bottom of the jar. Alternatively, means (not shown) can be provided to maintain the slide in a substantially horizontal position. Such means may, for example, comprise a horizontal arm (not shown) extending from leg 48 past supporting arm 56 and engaging the latter when the slide is in the horizontal position.

Because slide S is continuously biased downwardly, it will traverse the liquid media in the trays as conveyor 18r advances. An important aspect of the present invention is the provision of mechanism for raising slide S over the end walls of the respective jars to permit the slide to pass from liquid medium in one jar to the liquid medium in the succeeding jar. In accordance with one form of the present invention, bail 52 is pivoted about the axis of central bight 54 in response to forward movement of the slides by provision of an oblique cam surface 74 positioned adjacent to the top of each jar at the downstream end of the jar and in the path of travel of depending portion 60 of bail 52. The cam surface is so located that depending member 60 of the bail encounters a medial region of the cam surface when the slide is in the downward position (see FIG. 6). The cam surface extends outwardly and in a direction of forward conveyor movement so that the cam surface terminates at a point spaced outwardly of the medial region of the cam surface by a distance at least as great as the point of contact between the slide and the jar wall as the slide passes over the jar wall (see FIG. 7).

The operation of the apparatus of this invention is as follows: Appropriate liquid media are placed in respective jars 26, 28, 30 and 32 to perform the desired staining procedure. Microscope slides on which specimens have been placed in accordance with conventional techniques are fitted into a bail 52 which fitting procedure is most-convenient, because the bail and its supporting carrier 34 can be totally removed from the apparatus. With the slide firmly engaged at the outer end of slide supporting arm 56, the carrier is placed on rail 16 in sliding engagement therewith and member 50 is engaged with a link in conveyor reach 18r. It is to be understood that motor 22 operates continuously so as to advance conveyor reach 18r continuously; in one structure designed according to the present invention, conveyor reach 18r is moved at a speed of approximately 30 millimeters per minute or slightly in excess of 1 inch per minute. The length of the jars along the direction of the path of slide travel is selected so that the residence time of the slides in a particular medium is established at a desired duration. As the slide approaches the downstream end of a particular tank, depending leg 60 of the bail contacts cam surface 74. As the slide progresses downstream it slides outwardly along cam surface 74 and is lifted to a position shown in FIG. 7, at which time the slide is at a level sufficient to clear the upper edge of the jar wall. It will be noted that during the upward pivotable movement of the slide, the counter-balancing force applied by counterweight 66 gradually increases so that, as the buoyancy force on the slide reduces, there is a corresponding increase in the lifting force from the counterweight. When the slide is in the position shown in FIG. 7 all sides are inclined from the horizontal to obtain maximum drainage by permitting liquid accumulated on the slide to drop off the lower most corner of the slide. The transfer of liquid from one jar to the next is thereby substantially eliminated. Drainage is further enhanced by the fact that the bottom corner of the slide rubs against the jar wall as it exits from the jar.

When the slide clears the front end wall of the succeeding jar it drops into the liquid medium contained in such jar and the staining process continues. Such drop is not abrupt because of the effect of counterweight 66, and damage to the slide and specimen is avoided.

An alternate form for pivotally driving the slide up and over the jar walls is depicted in FIGS. 5, 5a and 5b. An identical supporting carrier 34, as has been previously described, is provided. Such carrier is adapted to slide along rail 16 as chain 18 is driven forward. The carrier defines coaxial double looped portions 38 and 46 which pivotally mount a bail 76. The bail includes a counter-balancing arm 78 and a counterweight 80 for performing identical functions ascribed hereinabove to elements 58 and 66 in FIG. 3. Integral with counterbalancing arm 78 is a central bight 82 that passes through coaxial double loop portions 38 and 46. Extending laterally outwardly toward the jar path is a horizontal arm 84, at the outer end of which is an integral downwardly and rearwardly angled leg 86. At its free or lower end, leg 86 is provided with a slide engaging hook 88.

The operation of this form of the invention can be discerned from a careful perusal of FIG. 5. In the figure the slide carriers are driven toward the left as viewed in the figure. When the slide approaches a jar wall such as is indicated at 90 in the figure, rearwardly bent bail leg 86 slides up the jar wall in response to forward (leftward) movement of the bail. Thus, the bail and the slide carried thereon are pivotally moved upwardly over the jar wall during which movement the liquid is permitted to drain from the slide. Counterweight 80 reduces the amount of power needed to so pivotally move the bail and assists in gently lowering the bail into a succeeding jar.

The embodiment of the present invention shown in FIGS. 5, 5a and 5b operates properly without necessity for forming cam surfaces 74 on the jars and, thus, affords a simplification with respect to the embodiment of the invention shown in FIGS. 3, 4, 4a and 4b. However, the latter form of the invention, because the slide is disposed vertically downwardly with respect to horizontal leg 86, permits closer spacing between adjacent slides than is possible with the form of the invention shown in connection with FIGS. 5, 5a and 5b.

The arrangement of apparatus of this invention is such as to afford practice of virtually all staining procedures. Versatility is achieved by placing the appropriate number of jars in the path of slide travel and dimensioning such jars to secure the desired residence time in each solution in the staining process. One apparatus designed according to the invention has a path parallel to conveyor reach 18r of approximately six feet in length. Such structure is satisfactory for carrying out a wide variety of staining procedures, for example, one in which 26 separate liquid media and an equal number of jars are required to stain a specimen. Because a slide is tilted each time it passes from one jar to the next, the transfer of one liquid to the next, and the consequent pollution of the succeeding liquid, is substantially avoided, thereby materially extending the useful life of the liquid media contained in the jars.

Figure 2:
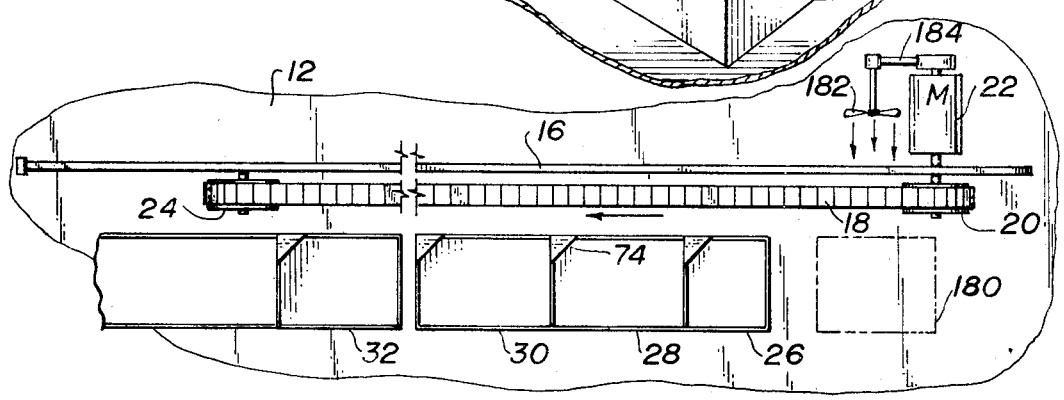
FIG. 2 is a plan view of the apparatus of FIG. 1.

It can also be appreciated from the foregoing specific description of the apparatus that the slides, once mounted on a carrier, need not be handled by the operator, thereby avoiding skin contact with possibly toxic liquid media. Contributing to this advantage is the fact that each carrier is removable or separable from the conveying system and that the rail 16 extends beyond the output end of conveyor reach 18r. Thus, the user of the device can permit a plurality of slide containing bails to accumulate at the output end of the device without any personal attention to the output end of the device, and the slides residing in a suitable medium in jar 90. Moreover, the invention is readily adaptable for incorporation of other accouterments. For example, in FIG. 2 there is shown schematically at 180 a drying chamber which is adapted to, for example, set the adhesive used to mount the specimen on the slide, and which drying chamber can be supplied with continuously moving air current from a fan 182 driven through a drive train 184 from motor 22. The provision of drying chamber 180 is optional and does not affect the improved mode of operation afforded by this invention.

Referring to FIG. 13, the liquid media stored in jars 96 sometimes emits toxic or unpleasantly smelling fumes. To prevent the pollution of the surrounding atmosphere with such fumes, a cover 98, preferably constructed of a transparent material to enable the viewing of the interior of the jar, is spaced apart from top 100 of the jar and is mounted to a vacuum tube 102 in a conventional manner. The vacuum tube has a longitudinal slit 104, or it can have a plurality of longitudinally spaced apertures, to communicate the interior of the vacuum tube with the space between cover 98 and the surface of the liquid in the jar. The vacuum tube is permanently secured at an appropriate level with respect to the jar, and is connected to a suitable vacuum source such as a vacuum pump (not shown).

Cover 98 is spaced from jar top 100 a sufficient distance to permit passage of the horizontal arms of the bail (not shown in FIG. 13) between the jar top and the cover as the slide carrier moves past the jar. The cover terminates short of jar walls 106 positioned transversely to the direction of travel of the slide carrier to permit the raising of the arm and the slide secured thereto out of the jar. Alternatively, the jar cover 98 can be raised a sufficient amount above jar top 100 to provide enough room for the raising of the slide mounting arm. This permits the placement of a single, elongate cover over several adjacent jars.

In operation, the vacuum source is actuated and withdraws fumes evaporating from the liquid contained in the jar into the vacuum tube 102 from where it can be exhausted at a suitable location. The provision of the vacuum tube and the cover permits the convenient and hazardless operation of the apparatus of the present invention, even when employing toxic liquids. As a result, the apparatus may be placed inside laboratory rooms even if such rooms are not provided with elaborate ventilation systems.

Referring to FIG. 8, the continuous feeding and immersion apparatus of the present invention generally employs a number of serially arranged jars, which can be of different lengths to control and to vary the immersion time for a slide as it is carried past the jars. Many, if not all, of the jars include different treating solutions. As long as the same samples must be treated in the same manner, e.g., must be immersed in the same solutions, for the same lengths of time, and in the same sequence, the feed apparatus is constructed as described at the beginning of this specification. In many instances, as in general medical laboratory application of such apparatus, the samples vary and the treatments which they must undergo vary likewise. Thus, any one of the above mentioned parameters might require a change.

To enable the use of the apparatus for the concurrent treatment of different samples, means are provided to prevent the immersion of certain of the samples in one or the other of preselected jars. According to the invention, suspension rods 108 are mounted to rail 16a or to supporting surface 12a and positioned parallel to the rail to engage one of the arms of the bail of each slide carriage. It is preferred to place the suspension rods on the side of the conveyor opposite the jars and to engage the arm mounting the counterweight with the rods. The rods are placed so that samples mounted on bails engaged by a certain set of rods are only immersed in jars containing the solutions for the desired treatment in the necessary sequence. Other samples requiring different treatment are mounted on bails engaging another set of suspension rods which permit the immersion of the samples in the same or different jars in the sequence required by the different treatment.

Thus, a single apparatus can be employed for treating various samples in accordance with different methods by providing a plurality of suspension rod sets. The number of different sets employed is adjusted to suit the particular application of the apparatus and the number of different treatment methods that are encountered in its use.

Referring now to FIGS. 8-11, in a preferred embodiment of the invention, the suspension rods comprise length of rails having substantially rectangular cross sections and which interact with suspension rod engaging surfaces 110 and 112 of bails 114. Two sets 116 and 118 of suspension rods (hereinafter referred to as sets) are illustrated and the cross-sections of the rods are angularly inclined with respect to each other. The rods extend parallel to rail 16a supporting a carriage 122 which pivotally mounts the bail.

The relative position of the suspension rods with respect to bails 114, and particularly with respect to bail pivot point 124, is of importance. Each set consists of one or more aligned suspension rods which are sequentially located in the direction of travel of the bail (see FIG. 8) and which have a length and spacing as more fully set forth hereinafter. The suspension rods of set 116 are farther removed from pivot point 124 than the suspension rods of set 118. Accordingly, distance 130 between pivot point 124 and rod edge 125 of the rods of set 116 facing the pivot point is greater than the distance 128 between rod edge 127 of the rods of set 118 and pivot point 124. The distance between the pivot point and the rod edge or side of the rods in a particular set facing the pivot point is the same for all rods in that set while it is different from that distance for rods in any other set.

Arm 132 of the bail is formed of wire, or it can be constructed of a solid material, and extends away from the pivot point in the opposite direction from that portion of the bail mounting a slide 126 which is to be immersed in the jars. The arm defines suspension rod engaging surfaces 110, 112 and is constructed so that surface 110 cooperates with the suspension rods in set 116 and surface 112 cooperates with the rods in set 118. The rod engaging surfaces of the bail arm are positioned so that they engage at least a portion of the suspension rods in the associated set while preventing an interference of such surfaces with the rods in other sets during the operable movement of bail 114 to immerse slide 126 in and withdraw it from the jars along rail 16a. Accordingly, spacing 134 between pivot point 124 and a terminal point 136 of rod engaging surface 112 is greater than the distance 128 to assure interengagement between that surface and rods of set 118. Spacing 134 is less than the distance 130 between pivotal point 124 and edge 125 of the rods of set 116 to permit the pivotal movement of bail 114 from the position shown in FIGURES 9-11 to a horizontal, slide 126 immersing position.

If the bail arm 132 is constructed to have only rod engaging surface 112, as illustrated in FIG. 10, slide 126 is pivoted out of the jars as long as a suspension rod in set 118 is present adjacent the jars. If no rod belonging to set 118 is present the weight of slide 126 pivots bail 114 into the slide immersing, horizontal position in the direction indicated by arrows in FIGS. 9-11. The presence or absence of suspension rods belonging to set 116 does not affect the slide immersion since terminal point 136 cannot contact suspension rods in set 116.

Similarly, spacing 138 between pivot point 124 and terminal point 140 of rod engaging surface 110 is greater than the distance 130 between the pivot point and edge 125 of the suspension rods of set 116. This assures engagement of surface 112 with the rods in that set. Should a third set of rods (not shown) be provided spacing 138 must be less than the distance between the pivot point and the pivot point facing rod edges of the suspension rods in that third set.

Although the spacing between the pivot point 124 and terminal point 140 of rod engaging surface 112 is greater than the distance 128 between the pivot point and face 127 of the rods in set 118, no interference in the operation of the apparatus results since the bail only pivots between the horizontal position and the inclined position shown in FIGS. 9-11. Thus, the portion of the bail arm defining rod engaging surface 110 never comes into contact with suspension rods of set 118 or sets (not shown) positioned further away from set 116 in the direction opposite to the pivotal, slide immersing movement of the bail.

With this configuration of the bail and the relative positioning of the suspension rods each rod engaging surface cooperates with its associated set while it is unaffected by other sets. Thus, the downward pivotal movement of the slide after the rod engaging surface becomes disengaged from the associated suspension rods is not hindered by the adjoining set as the bail pivots about point 124 between its slide immersing, horizontal position and its slide withdrawing, inclined position illustrated in FIGS. 9-11.

The apparatus is provided with a plurality of slide carriages and bails which have arms 132 of varying configurations. A first bail (illustrated in FIG. 9) is constructed to include rod engaging surface 110 only so that the immersion of slides 126 secured to that bail can only be prevented by suspension rods belonging to set 116. Similarly, the bail illustrated in FIG. 10 is provided with suspension rod engaging surface 112 only so that suspension rods belonging to set 118 are the only ones which can prevent the immersion of the slide into a jar. Lastly, a third bail illustrated in FIG. 11 is provided with both engaging surfaces 110 and 112 so that suspension rods in either one of the two sets prevents the immersion of the slide in the jar.

Referring to FIG. 8, and assuming that the apparatus is provided with the three different bails illustrated in FIGS. 9–11 and the arrangement of suspension rods is as illustrated in FIG. 8, slides mounted on the bail illustrated in FIG. 9 are immersed in jars A, B, D, E, and G; slides secured to the bail illustrated in FIG. 10 are immersed in jars A, C, E, and H; while slides secured to the bail illustrated in FIG. 11 are immersed in jars A and E only. The number of variations can be increased as desired by adding additional sets of suspension rods and increasing the number of different bail configurations.

Referring briefly to FIG. 12, an alternatively construced bail 142 is illustrated. The bail includes a pivot shaft 144 for engagement by the slide carriage mounted to the chain conveyor and an arm 146 extending away from slide 126 and including an enlarged head 148 which is sized to act as the counterweight for the slide. The arm includes laterally spaced, inwardly extending notches 150, 151, and 152 which are successively further spaced from pivot shaft 144 and which define surfaces engaging three laterally spaced, vertically stacked sets of suspension rods 154, 155, and 156. Fingers 158 defining the notches in head 148 are spaced so that their ends 160 do not contact the suspension rods of the next adjoining set of rods when the bail is pivoted between its horizontal and inclined positions. The bail illustrated in FIG. 12 further includes a spring clip 162 for demountably holding slide 126. This configuration of the bail is particularly advantageous for solid bail constructions instead of formed wire bail constructions. The construction is ideally suited for injection molding the bail for applications in which the liquid into which they are immersed is corrosive and for disposable type bails.

Thus, it will be seen that the present invention provides continuous slide staining apparatus which is highly versatile both in the number of slides stained per unit of time and in the particular staining sequences to which the specimens must be subjected.

Although several embodiments of the invention have been shown and described, it will be obvious that other adaptations and modifications can be made without departing from the true spirit and scope of the invention.

I claim:

1. Apparauts for sequentially immersing a slide mounted specimen in a plurality of liquid media comprising a plurality of open top liquid impervious jars for containing the liquid media, means for supporting said jars along a generally horizontal path, a conveyor having a reach parallel to said path, a slide carrier operatively connected to said conveyor for movement along the path, a bail mounted to said carrier for pivotal movement about an axis generally parallel to the path, said bail having a first arm projecting from the pivotal axis into the jar path, said arm including a generally downwardly projecting portion spaced from the pivotal axis for the periodic engagement by the jars during its movement along said jar path, said jars and said downwardly projecting portion having a configuration imparting torque around said axis in response to an engagement between a jar and said downwardly projecting portion pivoting said first arm upwardly.

2. Apparatus according to claim 1 wherein said jars include a cam member mounted adjacent the downstream end of said jars, said cam member having a medial region in the path of travel of said downwardly projecting arm portion, said cam member also having a terminal portion at the level of a wall of the jar downstream of the medial region, said cam member further having a continuous bearing surface intermediate said medial region and said terminal portion so that said downwardly projecting arm portion slides along said bearing surface in response to forward movement of said bail and pivots said bail upwardly.

3. Apparatus according to claim 1 wherein said downwardly projecting arm portion is angled rearwardly with respect to the direction of forward conveyor movement from a point above upper ends of portions of the jar aligned with the path of said downwardly projecting arm portion so that said bail pivots upwardly in response to forward conveyor movement and when said downwardly projecting arm portion contacts said jar portions.

4. Apparatus according to claim 1 wherein said bail includes a counterbalancing arm extending oppositely from said first arm, said counterbalancing arm being weighted to impose a torque at said opposite end less than the torque imposed by said first arm, said counterbalancing arm being angled upwardly relative said first arm so that said counterweight imposes relatively more torque about the axis when said first arm is in the raised position, whereby the counter torque is inversely proportional to the buoyancy force of the liquid media on the slide.

5. Apparatus according to claim 1 including a suspension rod mounted adjacent a selected jar, extending parallel to the path of travel of said slide carrier, and positioned to engage said bail to maintain said slide in a raised position and prevent said slide from being immersed in said selected jar.

6. Apparatus according to claim 5 wherein said suspension rod is disposed on the sides of said axis opposite from said slide and including a plurality of bails only some of which are provided with suspension rod engaging surface whereby slides can be immersed in said preselected jar by selecting a bail having no suspension rod engaging surface.

7. Apparatus according to claim 5 including a plurality of parallel, laterally spaced sets of suspension rods disposed adjacent a plurality of preselected jars, and a plurality of bails having first and second suspension rod engaging surfaces, the suspension rod engaging surfaces being positioned with respect to said axis so that engagement of suspension rods by one of said first and second surfaces prevents the immersion of said slide in the adjacent preselected jar, said first and second surfaces being further positioned with respect to said axis whereby each of said first and second surfaces can egage only one of said sets of suspension rods.

8. Apparatus according to claim 7 wherein the distance between said axis and an edge of said suspension rods closest said axis is different for each of said sets, said distance increasing for each adjoining one of said sets in the direction of movement of said engaging surfaces when said slide is being immersed into a jar, said engaging surfaces terminating at outermost points having spacing from said axis which is greater than said distance for suspension rods in sets associated with said engaging surface, and which is less than said distance for suspension rods in the next adjoining set of rods located in the direction of movement of said surface when said slide is being immersed in the jar.

9. Apparatus according to claim 8 wherein at least some of said bails include a number of suspension rod engaging surfaces which equals the number of sets of suspension rods.

10. Apparatus according to claim 8 wherein at least some of said bails include a number of suspension rod engaging surfaces which is less than the number of sets of suspension rods.

11. Apparatus according to claim 1 including a cover spaced from the top of said jars to provide access into the jar for said first arm, means supporting said cover in that position, and vacuum means mounted to communicate with the space between the top of said jar and said cover for evacuating gas from said space, whereby the emission of toxic and harmful fumes from open top jars is prevented.

12. Apparatus according to claim 1 wherein said slide has a generally rectangular outline, wherein said first arm includes means for demountably securing said slide to said arm, and wherein said slide securing means is constructed to place the slide in a position in which all peripheral sides of said slides are non-horizontal when said slide is not immersed in the jar.

13. Apparatus according to claim 1 wherein said conveyor comprises continuous means traveling over a pair of spaced apart roller means having horizontal axes perpendicular to the travel path of said continuous means, and including a support rail for said slide carrier adjacent and parallel to an upper reach of said continuous means, the rail extending beyond the horizontal portion of said upper reach, said slide carrier having a vertical member operatively connecting said carrier with said continuous means, whereby transport of said carrier by said continuous means past the horizontal portion of said reach automatically disengages said carrier from said continuous means while said rail continues to support said carrier.

14. Apparatus for sequently immersing a slide mounted specimen in a plurality of liquid media comprising:
(a) a plurality of open top liquid impervious jars for containing said liquid media and positioned along a generally horizontal path, each jar being separated from the next adjoining jar by an upright wall,
(b) conveyor means for supporting and moving objects parallel to said path, and
(c) a slide carrier operatively connected to said conveyor and including a member mounting a slide extending into said jars and means permitting pivotable movement of said member upwards and away from said jar and towards said conveyor means about an axis generally parallel to said path, said member cooperating with said jars to pivot said member upwardly out of said jars when said member engages a portion of said jars.

15. Apparatus according to claim 14 wherein said member includes a generally downwardly and, with respect to the forward movement of said conveyor means, rearwardly projecting portion positioned to engage an upper end of said upright wall, whereby the interengagement between said downwardly and rearwardly sloping portion and said upright wall pivots said member and said slide upward out of said jar.

16. Apparatus according to claim 15 including suspension means independent of and disposed parallel to said conveying means, and positioned to engage a section of said member when said slide is raised above said jars, said suspension means maintaining said slide and said downwardly and rearwardly sloping portion suspended above a selected jar while said conveying means moves said carrier past said selected jar.

17. Apparatus according to claim 16 including a plurality of sets of suspension means and a plurality of carriers for placement on said conveyor, and wherein at least some of said carriers are provided with members having a configuration to engage only one of said sets of suspension means.

18. Apparatus according to claim 14 wherein said member includes means for demountably securing said slide, said securing means and said slide carrier being constructed so that edges of said slide are in a non-horizontal position when said portion is raised above said jar.

References Cited

UNITED STATES PATENTS

| | | | |
|---|---|---|---|
| 1,731,095 | 10/1929 | Draeger | 134—70 XR |
| 2,512,643 | 6/1950 | Hannon | 134—70 |
| 3,119,486 | 1/1964 | Davis | 134—70 XR |
| 3,144,030 | 8/1964 | Donovan | 134—83 XR |
| 3,158,249 | 11/1964 | Harper et al. | 134—70 XR |
| 3,391,670 | 7/1968 | Lester et al. | 118—426 XR |

ROBERT L. BLEUTGE, Primary Examiner

U.S. Cl. X.R.

118—423; 134—83, 126